United States Patent [19]

Dola et al.

[11] 4,040,709

[45] Aug. 9, 1977

[54] LIGHTING UNIT ASSEMBLY

[75] Inventors: Frank Peter Dola, Port Richey; Frederick William Rossler, Jr., New Port Richey, both of Fla.

[73] Assignee: AMP Incorporated, Harrisburg, Pa.

[21] Appl. No.: 631,253

[22] Filed: Nov. 12, 1975

[51] Int. Cl.$^2$ ............................................. H02B 1/02
[52] U.S. Cl. ............................. 339/125 L; 339/127 R
[58] Field of Search .................. 339/10, 90 F, 119 L, 339/121, 125 R, 125 L, 126 R, 127 R, 188 R

[56] References Cited

U.S. PATENT DOCUMENTS 3,488,626   1/1970   Koerper et al. ............. 339/125 L X Primary Examiner—Roy Lake
Assistant Examiner—E. F. Desmond Attorney, Agent, or Firm—Frederick W. Raring; Robert W. Pitts; Jay L. Setichik

[57] ABSTRACT

Lighting unit assembly which is adapted to be mounted in a panel comprises a housing having wall portions which define a plurality of enclosures, each enclosure surrounding a lamp bulb mounting site. The lamp bulbs are mounted in removable lamp bulb connectors which have contact terminals which are in contact with the bulb and are also in disengageable contact with terminals in a tap connector. The tap connectors are mounted in the housing adjacent to the lamp bulb sites and the conductors extend through these tap connector housings and are electrically connected to the tap connector terminals. The lighting unit assembly is completely pre-wired and assembled so that when it is inserted into a panel, a harness connector on the conductors in the assembly can be immediately coupled to a complementary harness connector.

9 Claims, 10 Drawing Figures

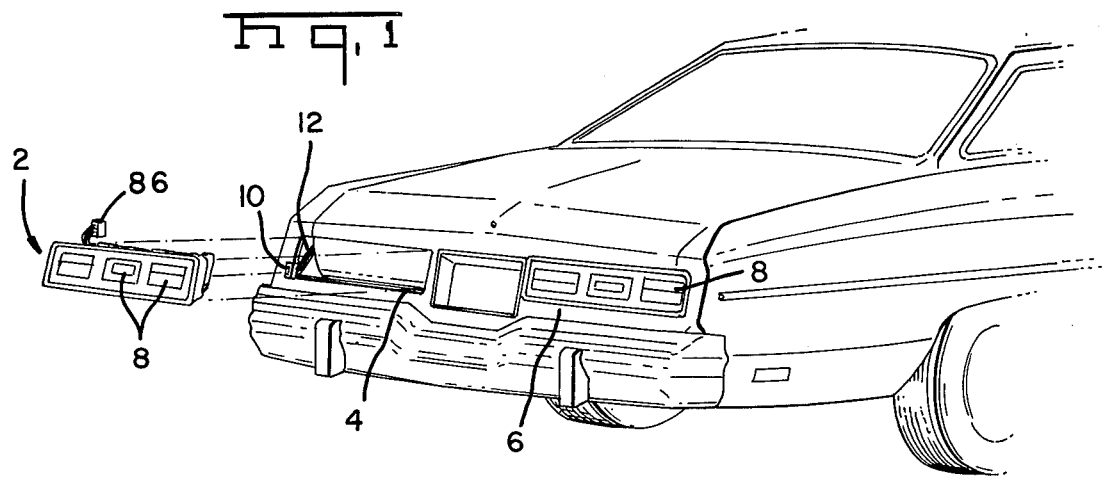
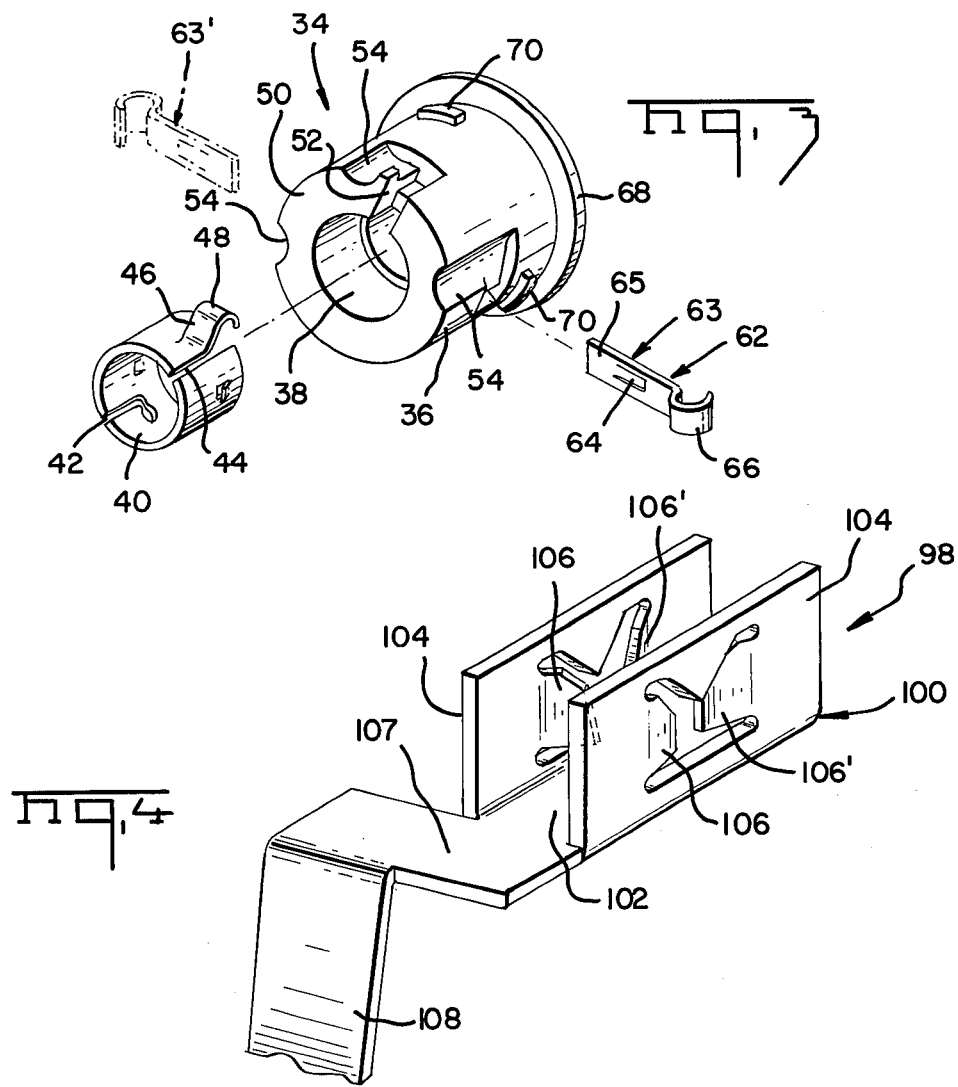

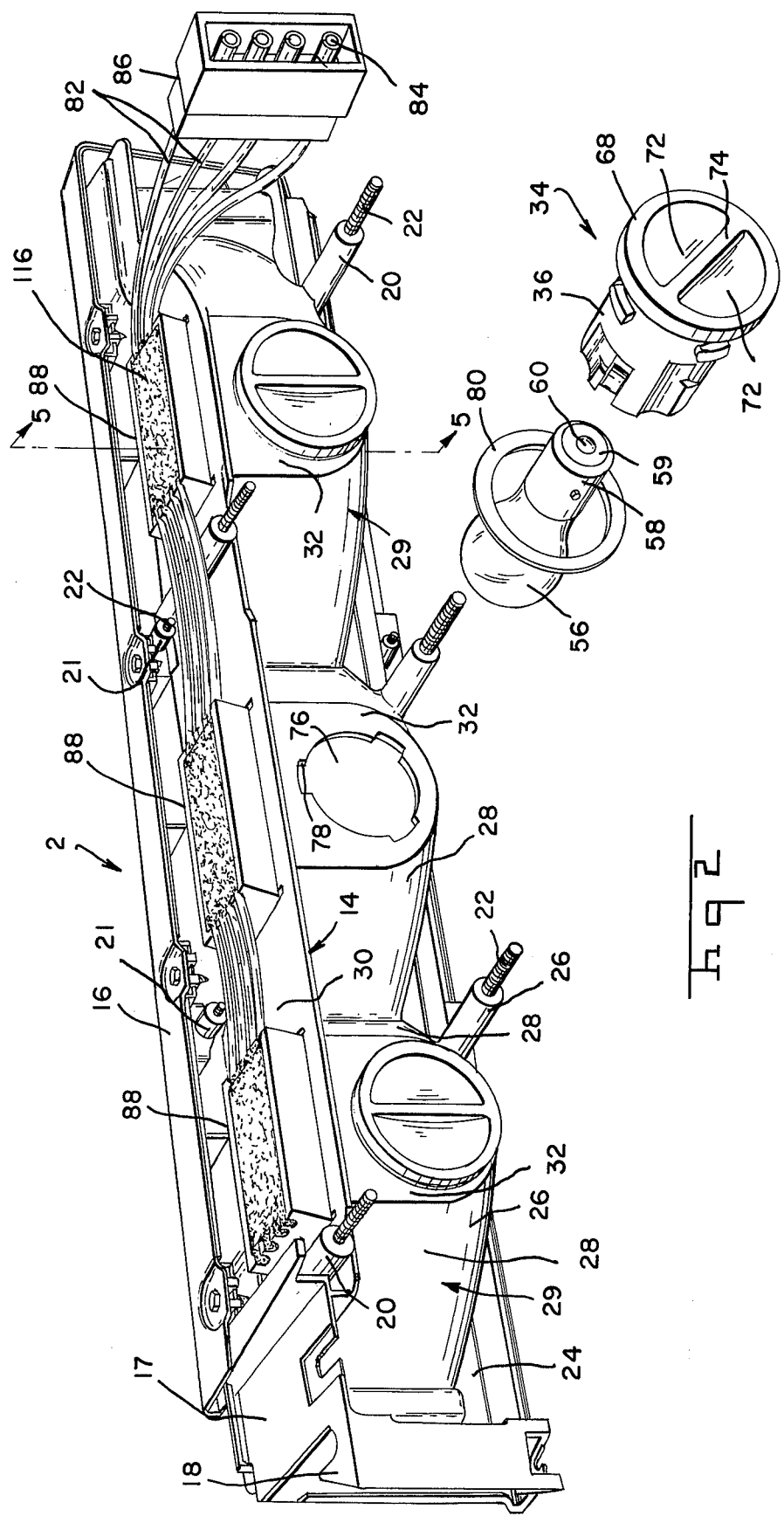

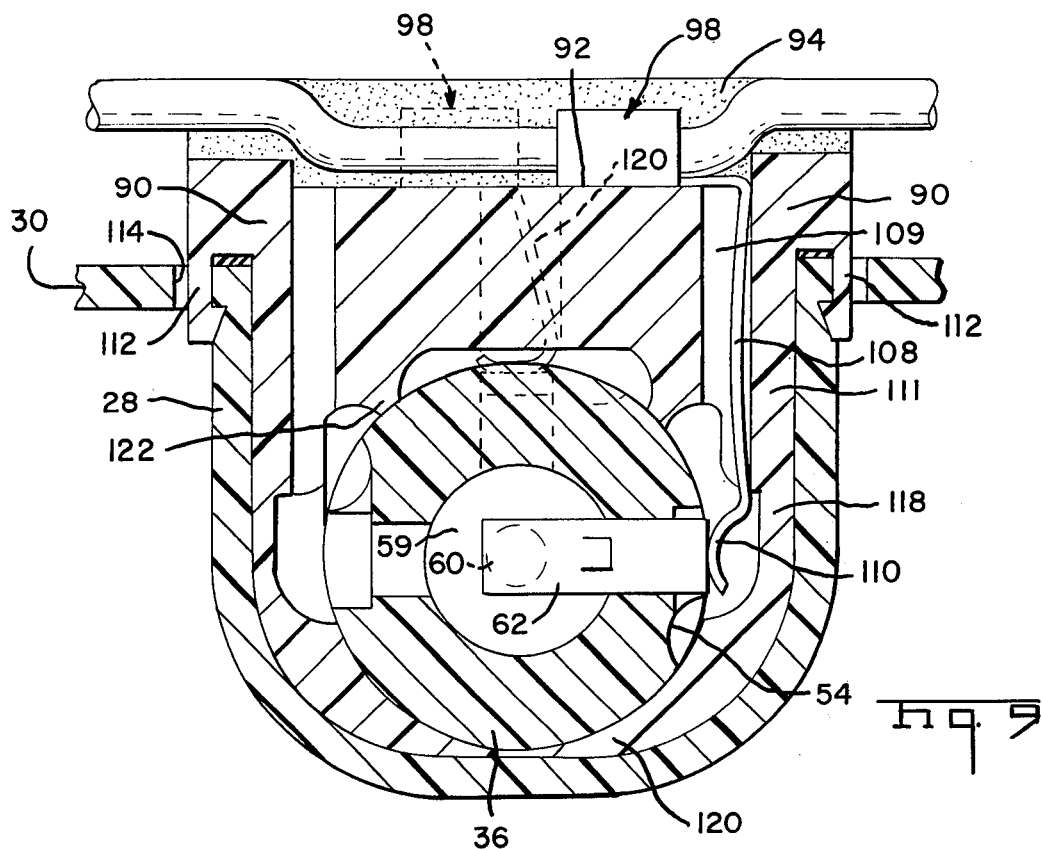
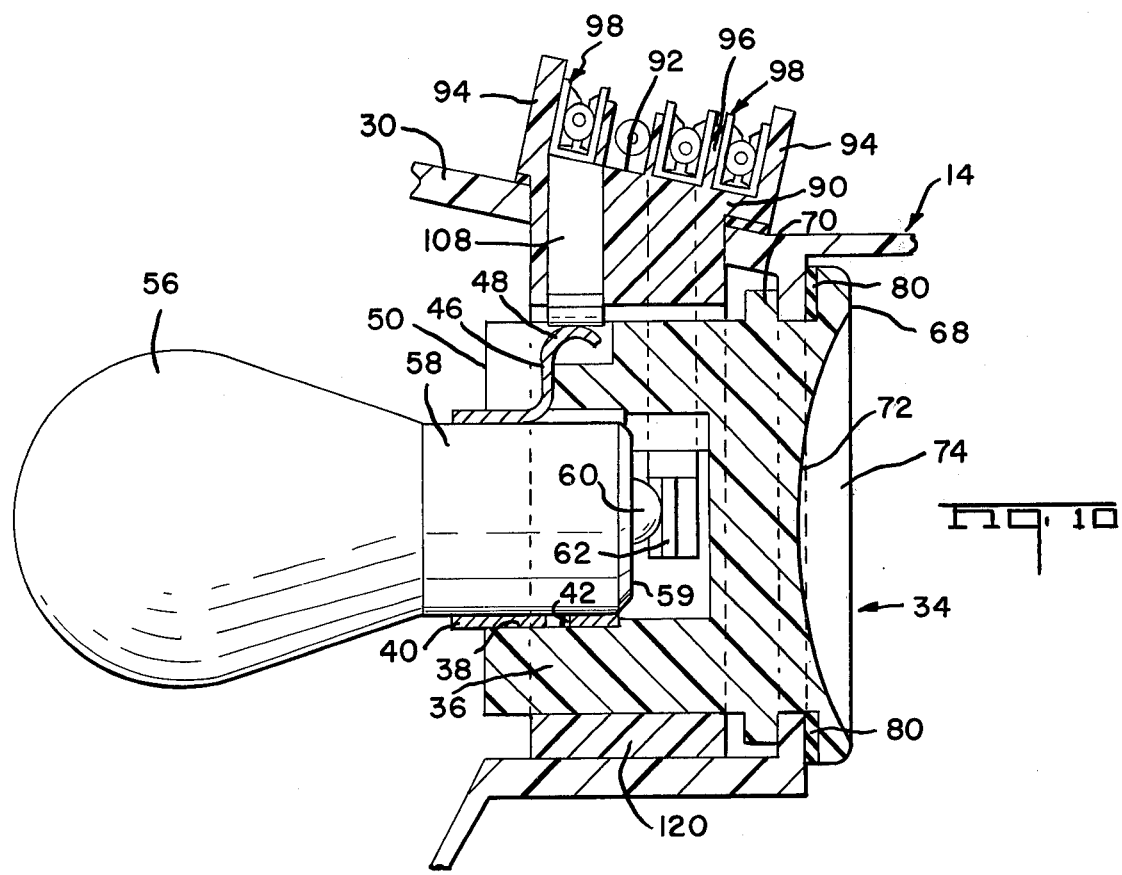

LIGHTING UNIT ASSEMBLY

BACKGROUND OF THE INVENTION

This invention is directed to the achievement of an improved lighting unit assembly which is adapted to be assembled to a panel from one side thereof and serviced from the other side of the panel. The invention is herein described in the form of a rear light assembly for an automobile but other uses for the invention will be apparent to those skilled in the art.

It is common practice in the art of automotive wiring to provide the rear lights of an automobile by mounting a housing in a rear panel from the exterior of the vehicle body. These conventional housings have a plurality of enclosures, each of which is adapted to contain a lamp bulb. The lamp bulbs are mounted in sockets which are directly attached to a portion of the electrical harness of the automobile. At the time of assembly, and after the housing has been mounted in the panel, the harness is positioned adjacent to the interior side of the panel and the individual lamp sockets on the harness are mounted in the housing so that each lamp bulb is located at the optical center or focus of its respective enclosure.

This procedure for providing the rear lights on the automobile has given rise to several problems. For example, since the lamp bulbs are contained in sockets which are part of the wiring harness, it is necessary to provide some slack wire in the portion of the electrical harness which extends past the housing in order to permit manipulation of the lamp socket during assembly insertion of the bulbs into the housing and during subsequent servicing as for example, when a bulb must be replaced. Such handling of the bulb and the accompanying movement of the wires in the harness can result in damage to the harness; for example, the electrical connections between the conductors and the bulbs might be disturbed or broken while a bulb is being replaced. Additionally, the slack wire which is in the trunk of the automobile adjacent to the rear panel thereof is sometimes engaged and pulled while cargo is being loaded into the trunk thereby giving rise to another source of damage to the harness. It should also be mentioned that the assembly procedure itself is awkward and unsatisfactory for the reason that each of the many bulbs required for the rear lights of the automobile must be individually and selectively inserted into the housing, a procedure which is time-consuming on an assembly line and subject to errors in bulb placement.

In accordance with the principles of the present invention, a completely pre-wired lighting unit assembly is provided comprising a housing and a plurality of conductors which extend neatly along one portion of the housing, the conductors being relatively taut and without a significant amount of slack wire. The ends of these conductors are attached to terminals in a multi-contact harness connector which need only be coupled to a complementary harness connector on the automotive harness to complete assembly and wiring of the unit during movement of the vehicle along the automotive assembly line. The conductors extend through a plurality of tap connectors mounted on the housing, one tap connector being provided adjacent to each lamp bulb site. The tap connectors contain contact tap terminals which are selectively connected to the connectors and which extend towards, and engage, contact terminals in a bulb holder connector. The bulb holder connectors have a bulb mounted therein and can be individually removed from the housing without disturbance to the conductors which are adjacent to the bulb sites.

It is accordingly an object of the invention to provide an improved lighting unit assembly. A further object is to provide a lighting unit assembly for the rear lighting requirements of a vehicle. A further object is to provide a lighting unit assembly which is completely prewired and assembled and which can be electrically connected to a harness by coupling a single harness connector on the lighting unit assembly to a complementary connector on a harness. A further object is to provide a lighting unit assembly in which the individual lamp bulbs are mounted in bulb connectors which are individually removable from the assembly without disturbance to the conductors in the assembly.

These and other objects of the invention are achieved in preferred embodiments thereof which are briefly described in the foregoing abstract, which are described in detail below and which are shown in the accompanying drawing in which:

FIG. 1 is a fragmentary view of the back end portion of an automobile which illustrates the assembly of a lighting unit assembly in accordance with the invention to a panel of the automobile.

FIG. 2 is perspective view of a lighting unit assembly in accordance with the invention, this view showing in the foreground the portion of the assembly which projects inwardly from the external panel of the vehicle.

FIG. 3 is a perspective exploded view of a bulb holder connector which forms a part of the lighting unit assembly.

FIG. 4 is a perspective view of a typical electrical tap terminal which is used in the tap connectors of the assembly.

FIG. 9 and 10 are views similar to FIGS. 6 and 7 respectively, but showing a modified form of the invention.

Figure 5:
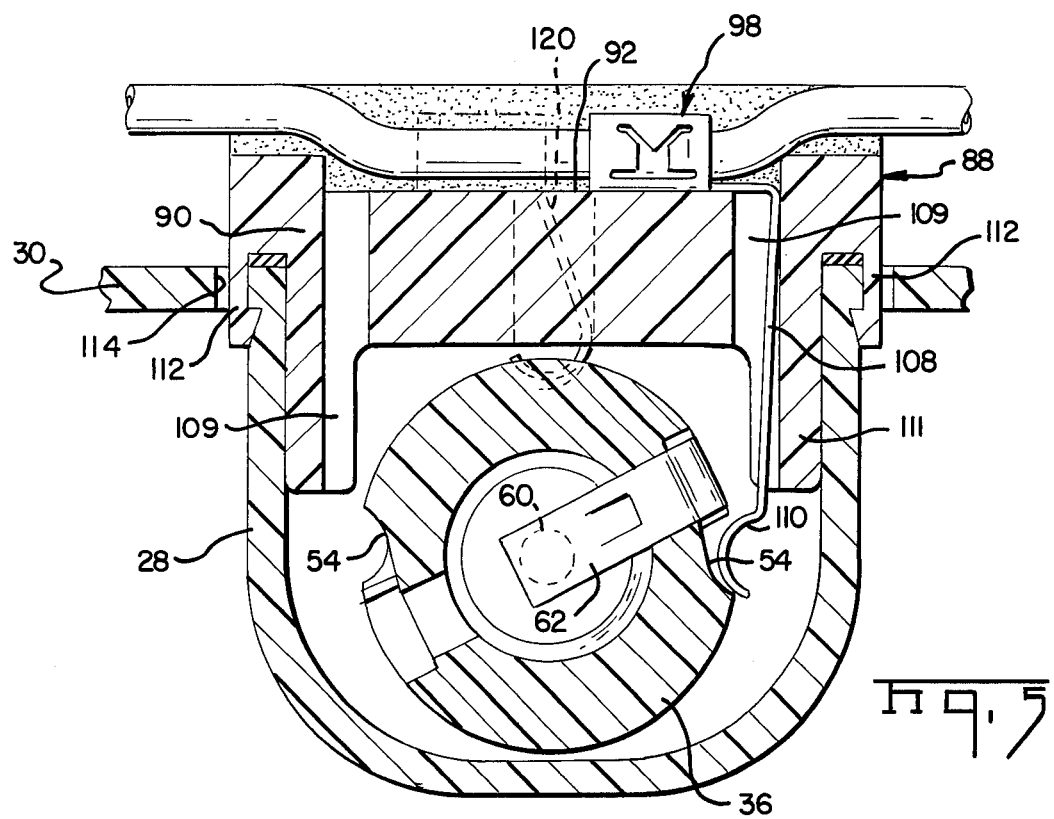
FIG. 5 is a cross sectional view taken along the lines 5—5 of FIG. 2 showing a bulb holder connector in the assembly housing, this view showing the positions of the parts immediately after insertion of the bulb holder connector and prior to rotating the connector in order to secure it to the housing.

As shown in FIG. 1, a lighting unit assembly 2 in accordance with the invention is adapted to be inserted from the external side of the panel 6 into an opening 4 in the panel to provide a battery of lights on the lefthand side of a vehicle. The assembly 2 is completely pre-wired and the electrical connections are made from the interior side of the panel 6 by connecting a connector 86 on the lighting unit assembly to a connector 10 which is on the ends of conductors 12 which are part of the automotive harness.

As shown in FIG. 2, the assembly 2 comprises a plastic molded assembly housing generally indicated at 14. Suitable metal trim may be mounted on the housing to form a decorative bezel and a stamped metal frame means 17 may also be mounted on the housing 14 for mounting and strengthening purposes. The frame 17 for example, has an integral ear 18 which is adapted to be engaged with supporting and mounting structure on the interior of the vehicle. Additional mounting means for the assembly 2 are provided in the form of integral posts 20, 21 which have threaded studs 22 extending from their ends. The studs project through openings in interior flanges of aprons (not shown) of the vehicle body and nuts are threaded onto the studs 22 to firmly clamp the assembly in position. It will be understood that the precise details of these mounting means, the details of the trim 16 and other features may vary from one vehicle to another. The assembly housing 14 comprises a wall 24 in which the lenses 8 are mounted and a plurality of enclosure walls which extend from the wall 24, each group of enclosure walls constituting an individual lamp site (enclosure 29). In the disclosed embodiment, the enclosure walls have generally conical portions 26 which merge with substantially flat wall portions 28 and these flat wall portions in turn merge with a continuous top wall 30. The inner end of each lamp site enclosure is defined by a backwall 32 having an opening 76 therein which is dimensioned to receive the bulb holder connector generally indicated at 34.

Referring to FIG. 3, each bulb holder connector 34 comprises a molded plastic cylindrical housing or body 36 having a central opening 38 in its lefthand end 50 as viewed in FIG. 3 for the reception of a sheet metal bulb socket 40. The socket has a bayonet slot 42 for a pin on the base of the bulb and has an open seam 44. An integral terminal 46 extends from the socket adjacent to the seam 44 and has a curved free end 48 which provides a contact surface for the tap contact terminal 98 described below. The housing 36 has a notch 52 in its end 50 for the accommodation of the terminal 46 so that the contact portion 48 of this terminal will be located inwardly on the end 50 and will project radially beyond the cylindrical surface of the housing. An inwardly concave surface 54 is provided on the housing adjacent to the contact portion 48 of the terminal to facilitate assembly of the bulb connector to the assembly housing as will also be described below.

As shown in FIG. 2, the bulb 56 has a conventional cylindrical base 58 and a contact boss 60 on its end 59. The contact boss 60 of the bulb is engaged by a bulb connector terminal 62 which has a shank portion 63 from which a retaining lance 64 is struck. The terminal 62 is inserted through a radially extending opening in the housing 36 and retained therein by the lance so that the inner end 65 of the terminal will contact the contact boss 60 of the bulb. The other end of the terminal 62 projects radially beyond the surface of the body 36 and has a curved contact end 66 which is also engaged by a tap terminal extending from the tap conector housing.

A radially extending collar 68 is provided on the end of the housing and locking bosses 70 project from the surface thereof adjacent to the collar. As shown in FIG. 2, the previously identified opening 76 has spaced apart notches 78 so that the bulb connector can be assembled to the assembly housing by aligning the bosses 70 with the notches 78, moving the bulb connector into the opening 76 and then rotating the bulb connector until the bosses 70 are against the interior surface of the wall 32. A gasket 80 is advantageously interposed between the opposed surfaces of the collar 68 and the internal surface of the wall 32, see FIG. 7. In order to facilitate handling of the bulb connector 34, recesses 72 are provided on its end which is adjacent to the collar 68, these recesses being divided by a central rib 74. As is apparent from FIG. 2, the vertical orientation of the rib 74 gives a visual indication that the bulb holder connection is properly inserted into the assembly housing and has been rotated to its locked position.

Figure 7:
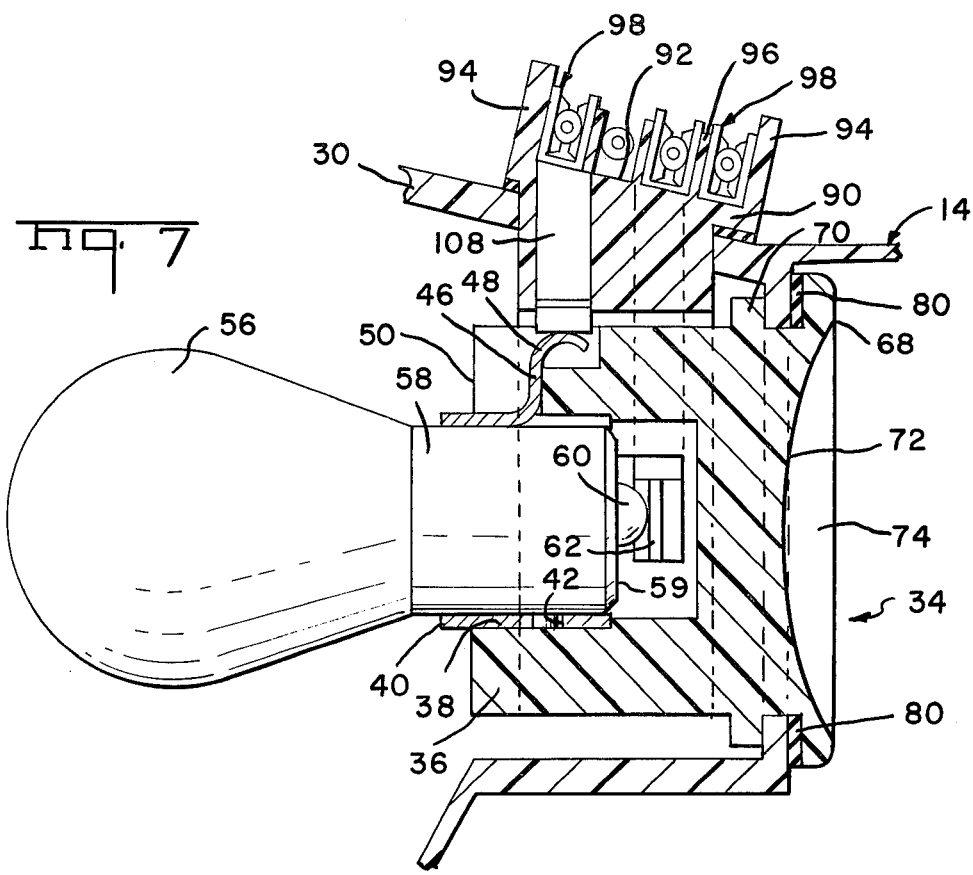
FIG. 7 is a view taken along the lines 7—7 of FIG. 6.

The conductors 82 for the several bulbs in the assembly extend, from the terminals 84 in the harness connector 86, in side-by-side parallel co-planar relationship along the upper side of the assembly housing past each of the site enclosures 29 and through tap connectors 88 at each of the lamp bulbs site enclosures. As shown in FIGS. 5 and 7, each tap connector comprises a generally rectangular body 90 having an upper surface 92 from which sidewalls 94 extend and from which spaced-apart barrier walls 96 extend which are parallel to, and between, the sidewalls. The individual conductors are located between the opposed surfaces of an adjacent pair of the barrier walls 96 and electrical connections are made to selective conductors by tap terminals 98, FIG. 4. The tap terminals each have a wire receiving portion 100 having a generally flat web 102 and spaced apart sidewalls 104. Each sidewall has two inwardly directed contact members or ears 106, 106' which are formed from the sidewalls as shown. The electrical connection of an individual tap terminal 98 to a conductor is made by simply moving the conductor laterally of its axis and locating it between the sidewalls 104. The opposed ears 106 on the two sidewalls are spaced apart by a distance such that their oppose inner edges will penetrate the insulation of the wire and establish electrical contact with the conducting core thereof. The ears 106' similarly have opposed edges which establish electrical contact with the wire.

The terminal has a contact arm 108 which is integral with the web 102 which is connected to web 102 by means of an offset section 107. It will be understood that not all of the tap terminals will have this offset section; it may be required or not depending upon the particular wire to which the terminal is connected.

Figure 6:
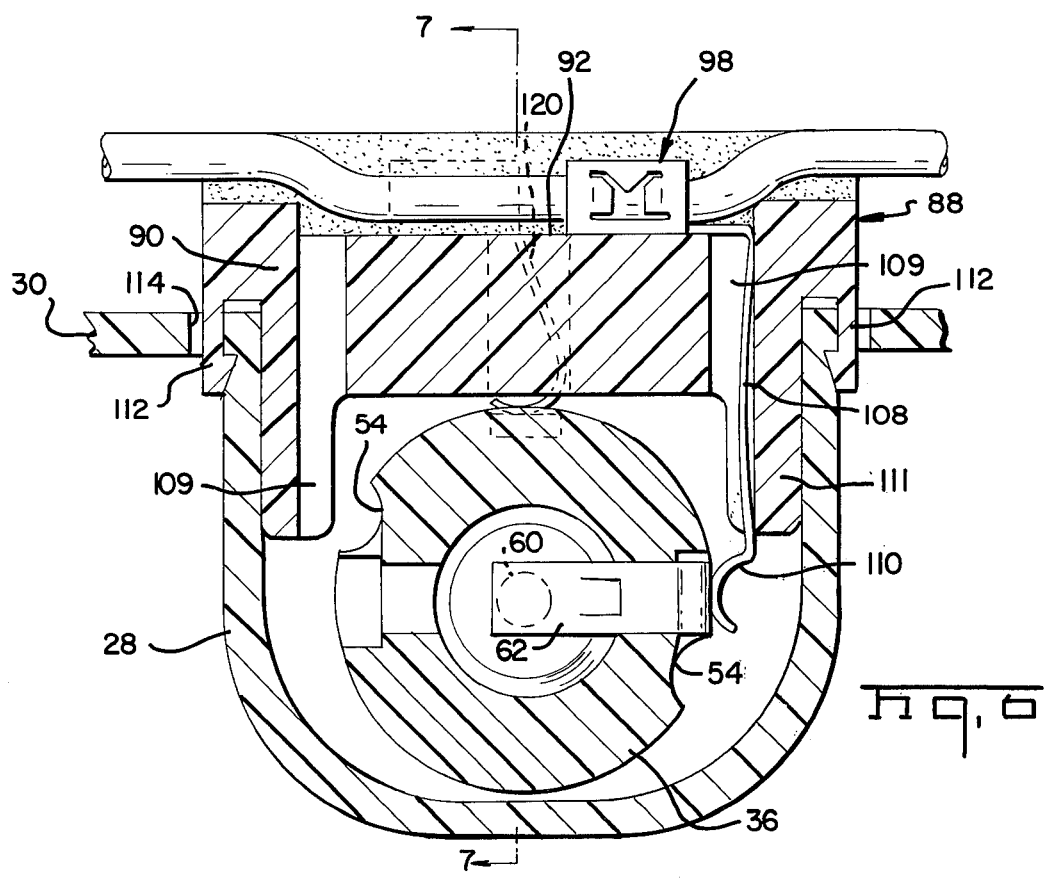
FIG. 6 is a view similar to FIG. 5 but showing the positions of the parts after the bulb holder connector has been rotated to its locked position.

The contact arms 108 extend downwardly through openings 109 in the body 90 and the free ends of the terminals are inwardly curved to provide a contact surface 110. FIG. 5 illustrates the desirability of the concave service portions 54 of the bulb housing 36. These contact ends 110 provide clearance for the ends 110 of the tap terminals during insertion of the bulb holder housing through the opening 76. After insertion, the ends 110 project into the recesses in the surface of the housing 36 and when the bulb holder housing is rotated from the position of FIG.5 of the position of FIG. 6, the contact ends are brought into engagement with the terminals 48, 62 in the bulb holder housing. It will be apparent from FIG. 5 that an additional terminal 120 is provided in the tap connector 88 for engagement with the integral terminal 46 of the bulb socket 40. The terminal 120 does not have an offset portion and is relatively shorter than the terminal 108 as is apparent from FIG. 5. The terminal 120 is connected to the lefthand wire shown in FIG. 7 which conventionally will be a ground wire.

The housing 88 has downwardly extending projections 111 which bear against the interior surface of the wall portions 28 of the assembly housing 14 in order to stabilize the tap connector housing on the assembly housing. The tap connector is secured to the wall 30 of the assembly housing by means of latch 112 having inwardly directed free ends as shown in FIG. 5. The main body portion of the tap connector extends through a rectangular opening in the wall 30 and the latch arms project through smaller openings on each side of the large opening.

As is apparent from FIG. 2, the conductors 82 can be positioned along the wall 30 with virtually no slack wire and sealing material 28 may be placed on the upper surfaces of the tap connectors to protect the electrical connections and render them waterproof. The ends of the conductors 82 can also be clamped, if desired, to the assembly housing 14 at a location adjacent to harness connector 86 by a strain relief means.

Figure 8:
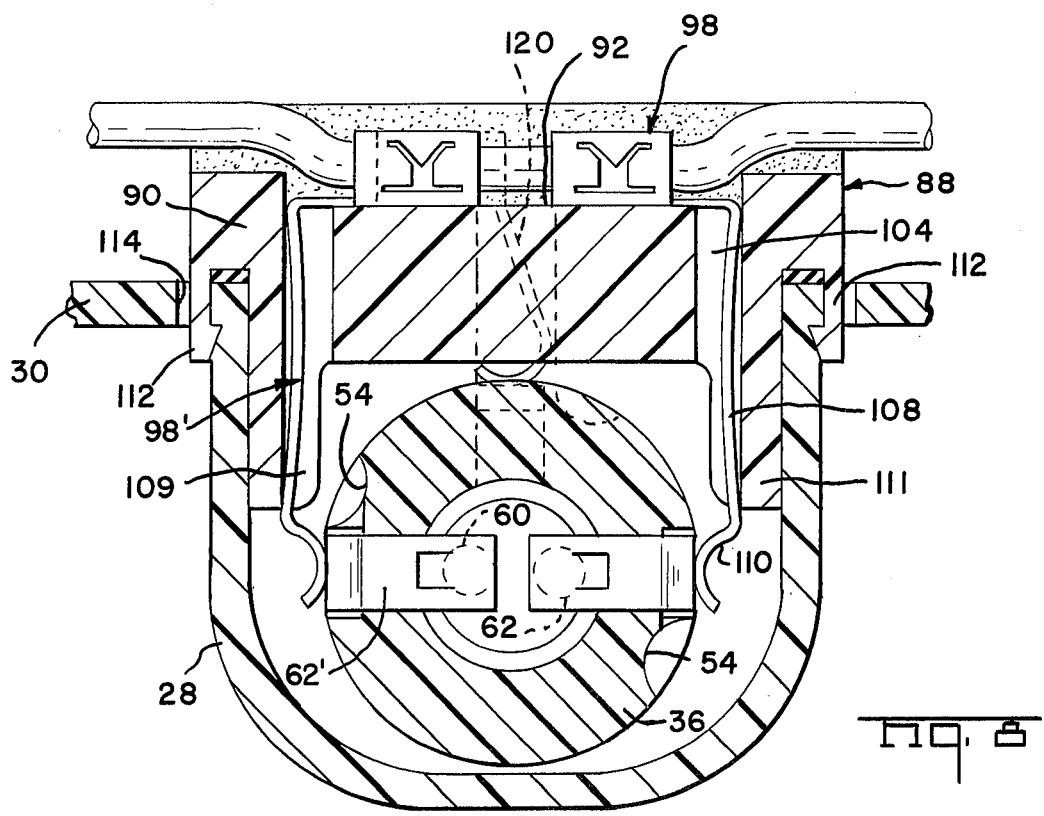
FIG. 8 is a view similar to FIG. 6 but showing the arrangement employed where the bulb is of the double filament type.

The embodiments described previously are intended for single filament bulbs however, some rear lighting arrangements require two bulbs which have two contact bosses 60 as shown in FIG. 8. For this type of bulb, a terminal similar to the terminal 62 is used in the bulb connector but the terminal for the two filament bulbs is somewhat shorter than the terminal 62 and two terminals are mounted in the housing on opposite sides thereof as shown in FIG. 8. An additional tap connector terminal 98' is also required.

When both single and double filament bulbs are being used in the assembly, the bulb holders 34 can be keyed for specific openings 76 so that the different types of bulbs can only be inserted into their proper openings. Keying can be accomplished, for example, by using different sized notches 78 and bosses 70 on the different bulb holder.

FIGS. 9 and 10 show a modified embodiment in which additional bearing support for the bulb holder connector is provided. In this embodiment, the extensions 111 of the body portion of the tap connector project downwardly as shown at 118 past the tap connector terminal and inwardly as shown at 120, these extensions being integral with each other and defining an extended cylindrical support surface for the complementary surface of the bulb holder connector housing. Additional support surface may be provided by means of arms 122 which extend from the underside of the tap connector housing.

We claim:

1. A lighting unit assembly which is intended to be mounted in a panel from one side thereof and to be serviced from the other side thereof, said lighting unit assembly comprising:
    an assembly housing having a plurality of lamp bulb sites therein, said housing being dimensioned to be inserted into said panel from said one side thereof,
    a plurality of electrical conductors extending along said housing, said conductors extending past electrical tap locations adjacent to said lamp bulb sites,
    electrical tap connector means at each of said tap locations, each of said tap connector means comprising a connector housing having electrical contact tap terminal means therein, each of said contact tap terminal means beings electrically connected to one of said conductors and each contact tap terminal means having a contact portion, said contact portion extending from said tap location towards the associated lamp bulb site,
    a bulb holder means removably mounted in said assembly housing at each of said lamp bulb sites, each of said bulb holder means comprising a bulb holder housing of insulating material, each of said bulb holder housings being individually mounted in said assembly housing, each of said bulb holder means having a socket for a lamp bulb, said bulb holder means and said assembly housing having cooperating mounting means for said bulb holder means, said mounting means permitting removal of said holders means from said other side of said panel,
    said contact portions of said contact tap terminal means in said tap connector means being in electrical contact with bulbs in said bulb holder means whereby,
    said lighting unit assembly can be assembled to said panel from said one side thereof, and said bulb holder means can be individually removed from said lighting unit assembly from the other side of said panel without disturbance to said conductors.

2. A lighting unit assembly as set forth in claim 1, each of said bulb holder housings having at least one bulb holder terminal means therein, each of said bulb holder terminal means having one contact portion in contact with an associated tap terminal means and another contact portion in contact with a bulb in said socket.

3. A lighting unit assembly which is intended to be mounted in a panel from one side thereof and to be serviced from the other side thereof, said lighting unit assembly comprising:
    an assembly housing having a plurality of lamp bulb sites therein, said housing being dimensioned to be inserted into said panel from said one side thereof,
    a plurality of electrical conductors extending along said housing, said conductors extending past electrical tap locations adjacent to said lamp bulb sites,
    electrical tap connector means at each of said tap locations, each of said tap connector means comprising a connector housing having electrical contact terminal means therein, each of said contact tap terminal means being electrically connected to one of said conductors and each contact tap terminal means having a contact portion, said contact portion extending from said tap location towards the associated lamp bulb site,
    a bulb holder connector at each of said lamp bulb sites, each of said bulb holder connectors comprising a bulb holder housing of insulating material having a socket for a bulb and having a bulb holder terminal therein,
    said bulb holder housing and said assembly housing having cooperating means for mounting said bulb holder housing in said assembly housing from said other side of said panel, and
    each of said bulb holder terminals having first contact portions which are in engagement with a spring contact portion of one of said contact tap terminal means and having second conact portions in engagement with a bulb in its respective socket whereby,
    said lighting unit assembly can be mounted to said panel from said one side thereof and said bulb holder connectors can be removed from said assembly from the other side of said panel for servicing of said assembly.

4. A lighting unit assembly as set forth in claim 3, said conductors having ends which are to be connected to further conductors, a multi-contact harness connector, said ends being connected to contact terminals in said harness connector whereby said conductors can be connected to said further conductors after mounting of said lighting unit assembly in said panel.

5. A lighting unit assembly as set forth in claim 3, said conductors extending in side-by-side parallel, substantially co-planar relationship past said electrical tap locations, with substantially no slack, said tap connector means comprising tap connector housings mounted in said assembly housing, said conductors extending through said tap connector housings.

6. A lighting unit assembly as set forth in claim 5, each of said contact tap terminal means having a conductor receiving portion and a contact arm, one of said conductors extending through said conductor receiving portion said contact arm extending laterally of said conductor receiving portion towards the associated lamp bulb site said contact portion being on said contact arm.

7. A lighting unit assembly as set forth in claim 3, said bulb holder connectors being generally cylindrical and having a bulb receiving end and a back end, said assembly housing having an opening proximate to each of said lamp bulb sites, said bulb holder connectors extending through said openings.

8. A lighting unit assembly as set forth in claim 7, said cooperating means for mounting said bulb holder connector in said assembly housing comprising ear means extending from said bulb holder connector and notches in edge portions for said openings in said assembly housing, said bulb holder connectors being removable from said housing upon rotation of said bulb holder connectors to align said ear means with said notches and moving said bulb holder connectors from said assembly housing.

9. A lighting unit assembly as set forth in claim 3, said cooperating means for mounting in said assembly housing having keying means whereby said bulb holder housings can be mounted only at predetermined bulb holder sites.

* * * * *